United States Patent
Sabsabi et al.

(10) Patent No.: US 12,459,006 B2
(45) Date of Patent: Nov. 4, 2025

(54) SYSTEM FOR THE ONLINE SORTING OF ORE SAMPLES BASED ON A MINERALOGY ANALYSIS

(71) Applicant: NATIONAL RESEARCH COUNCIL OF CANADA, Ottawa (CA)

(72) Inventors: Mohamad Sabsabi, Longueuil (CA); Daniel Gagnon, St-Mathias-sur-Richelieu (CA); Paul Bouchard, Montreal (CA); Aissa Harhira, Montreal (CA); Elton Soares De Lima Filho, Montreal (CA); Francis Vanier, Longueuil (CA); Josette El Haddad, Boucherville (CA); Alain Blouin, Montreal (CA); Christian Padioleau, Montreal (CA); Antoine Hamel, Brossard (CA)

(73) Assignee: NATIONAL RESEARCH COUNCIL OF CANADA, Ottawa (CA)

( * ) Notice: Subject to any disclaimer, the term of this patent is extended or adjusted under 35 U.S.C. 154(b) by 238 days.

(21) Appl. No.: 18/551,220

(22) PCT Filed: Oct. 14, 2021

(86) PCT No.: PCT/CA2021/051444
§ 371 (c)(1),
(2) Date: Sep. 19, 2023

(87) PCT Pub. No.: WO2022/192982
PCT Pub. Date: Sep. 22, 2022

(65) Prior Publication Data
US 2024/0165674 A1 May 23, 2024

Related U.S. Application Data

(60) Provisional application No. 63/163,292, filed on Mar. 19, 2021.

(51) Int. Cl.
*B07C 5/02* (2006.01)
*B07C 5/342* (2006.01)
(Continued)

(52) U.S. Cl.
CPC .............. *B07C 5/3427* (2013.01); *B07C 5/02* (2013.01); *G01N 21/718* (2013.01); *G01N 2021/845* (2013.01)

(58) Field of Classification Search
CPC ...... B07C 5/3427; B07C 5/02; G01N 21/718; G01N 2021/845
See application file for complete search history.

(56) References Cited

U.S. PATENT DOCUMENTS

| 7,886,915 B2 | 2/2011 | Shulman |
| 8,476,545 B2 | 7/2013 | Sommer et al. |

(Continued)

FOREIGN PATENT DOCUMENTS

| CA | 2950163 A1 | 5/2018 |
| CN | 106824825 A | 6/2017 |

(Continued)

OTHER PUBLICATIONS

El Haddad, Josette, et al. "Multiphase mineral identification and quantification by laser-induced breakdown spectroscopy." Minerals Engineering 134 (2019): 281-290.
International Search Report and Written Opinion dated Jan. 25, 2022, issued in corresponding international application No. PCT/CA2021/051444 by the Canadian Intellectual Property Office (6 pages).

*Primary Examiner* — Jamil Ahmed
(74) *Attorney, Agent, or Firm* — ROBIC IP Agency LP

(57) ABSTRACT

A system for the online sorting of ore samples based on mineralogy analysis includes a conveyor moving a stream of the ore samples along a conveying path, a LIBS module, a height measuring device, a focus controller and an airflow system. The LIBS module projects a LIBS laser beam along an optical path focused on an analysis spot of dimensions of (Continued)

the order of one or a few mineral components of the ore samples, and collects a returning LIBS light signal. The height measuring device and focus controller collaborate to adjust in real-time the focus of the LIBS laser beam to move the analysis spot perpendicularly to the conveyor according to a height of the ore samples crossing the optical path. The air flow system moves particles away from the optical path. A processing unit performs the mineralogy analysis of the ore sample based on the LIBS light signal.

19 Claims, 9 Drawing Sheets

(51) Int. Cl.
*G01N 21/71* (2006.01)
*G01N 21/84* (2006.01)

(56) References Cited

U.S. PATENT DOCUMENTS

| | | |
|---|---|---|
| 8,875,901 B2 | 11/2014 | Wellwood et al. |
| 10,107,788 B2 | 10/2018 | Shiley et al. |
| 10,493,494 B2 | 12/2019 | Bamber et al. |
| 2013/0073077 A1 | 3/2013 | Wellwood et al. |
| 2013/0264249 A1 | 10/2013 | Sommer, Jr. et al. |
| 2017/0261437 A1 | 9/2017 | Buchter et al. |

FOREIGN PATENT DOCUMENTS

| | | | |
|---|---|---|---|
| CN | 206974906 U * | 2/2018 | ............. G01N 21/71 |
| EP | 2008726 B1 | 8/2013 | |
| WO | 2012168938 A1 | 12/2012 | |
| WO | 2013013276 A1 | 1/2013 | |

* cited by examiner

SYSTEM FOR THE ONLINE SORTING OF ORE SAMPLES BASED ON A MINERALOGY ANALYSIS

CROSS-REFERENCE TO RELATED APPLICATIONS

This application is a filing under 35 U.S.C. § 371 of International Patent Application PCT/CA2021/051444, filed on Oct. 14, 2021, which claims priority to U.S. Provisional Application No. 63/163,292, filed on Mar. 19, 2021, each of which is incorporated by reference in its entirety.

TECHNICAL FIELD

The technical field generally relates to the on-site evaluation of ore samples and more particularly concerns a system using LIBS in real-time to obtain mineralogical information on ore samples.

BACKGROUND

To meet the rising global demand for key metals, the mining industry is challenged to employ smarter approaches to adjust to a general decline in ore grades, coupled with ever-increasing environmental pressures. Successful, environmentally aware exploration and mineral extraction require effective analyses of the elemental composition and mineralogy of ore-bearing rocks.

Characterization of minerals is a complex task, which may include measurements of elemental composition, mineralogy, lithology, hardness, and various other chemical or physical parameters. In the context of mining operations, mining companies typically require knowledge of ore properties for both mine planning and operations. Amongst other parameters, ore mineralogy has a strong influence on cost and efficiency of metal extraction. Ore metallurgical properties also affect the behaviour of the ore in processing steps such as crushing, concentration, and extraction.

Raw materials have a significant influence on the quality of final refractory products, as the crude ore often comes for processing with significant variations in chemical and mineralogical composition. Mining operators therefore wish to ensure the stable quality of raw materials using pre-assigned qualitative factors. This can be achieved by separating raw materials by grades, for example rejecting the portions of material unsuitable for a specific application, and by a reasonable control of the processing parameters based on real-time information about the chemical composition and mineralogy of raw materials. To enable this separation there is a need for fast online techniques, preferably providing simultaneous real time data on the elemental and mineralogical composition of the raw material or ore bearing rock.

Several technologies for ore analysis are known in the art, using data from multiple sensors each devoted to a particular outcome. However each of these techniques is best suited to a somewhat different list of mineral species.

NIR (Near InfraRed) analytical techniques generally have high utility in connection with measuring alteration minerals. These minerals result from alteration of the host rock and are often pathfinders for mineralization (presence of valuable metals). While the NIR region is sensitive to most alteration minerals, it lacks sensitivity to many rock-forming minerals and sulfide minerals.

FT-IR (Fourier Transform InfraRed) analytical techniques typically have utility for measurement of rock-forming minerals, and less utility for alteration minerals. However, FT-IR is not adapted for elemental determination.

Raman analysis has utility for sulfides, crystalline materials, and some rock-forming minerals, but it is not adequate for elemental determination. A Raman analytical system uses a laser beam of various wavelengths to excite the atoms of a sample causing them to move into various vibrational states. Some of these vibrational states cause some portion of the incident illumination to have a change in energy. Raman measures the shift in energy state, and materials often have a unique fingerprint for the Raman Shift.

The combination of NIR, FT-IR and Raman sensors is useful together to produce better qualitative and quantitative results. However, all these techniques need an additional method for elemental analysis. In fact, knowledge of elemental composition can assist in the identification of these minerals, since NIR, FT-IR and Raman are only molecular techniques. Thus, the need often arises to utilize an additional technique to measure the elemental composition of the minerals, such as X-ray Fluorescence spectroscopy (XRF) or via various chemical analyses. Additionally, the NIR region is not ideal for measurement of many rock-forming minerals, thus the addition of either Raman or Fourier Transform Infrared (FT-IR) spectroscopy is often separately used. Additional chemical or physical tests may also be used to provide a measure of the metallurgical processing parameters of the materials.

Quantitative mineral analysis (QMA) using energy-dispersive x-ray spectrometry and scanning electron microscopes (EDS-SEM) provide reliable information on the mineral abundance and texture of prepared rocks. However, electron-microscope-based instruments are designed for laboratory use and requires a time consuming preparation of the sample (polishing and sputtering of carbon), which makes it an offline technique not convenient for fast in-field measurements.

Laser-induced breakdown spectroscopy (LIBS) has been used for elemental analysis in many environments and recently has been demonstrated and employed for mineral quantification and identification. El Haddad et al. (Multiphase mineral identification and quantification by LIBS, Minerals Engineering, Volume 134, April 2019, Pages 281-290) showed a new laboratory method for mineral identification and quantification using LIBS that could be scalable to perform automated mineralogy measurement in coarse rock in a faster manner than conventional approaches based on QMA.

While any given analytical technique may be able to provide a subset of the required information, in many cases the accuracy and precision of that single analytical technique may be less than optimal for online analysis needed for ore mineralogy or elemental analysis needed to improve mining efficiency through ore sorting or monitoring the feed. The use of sensor-based ore sorting can make procedures significantly more efficient and markedly increase output.

There remains a need for an online analysis of the mineralogy of ore samples instead of the conventional approach of extracting samples for offline analyses in a laboratory, using expensive and time-consuming methods not adapted for fast analysis enabling the sorting of samples.

SUMMARY

In accordance with one aspect, there is provided a system for the online sorting of ore samples based on a mineralogy analysis thereof, comprising:

a conveyor for moving a stream of the ore samples along a conveying path, the ore samples having a variability of sample height over the conveyor;

a LIBS module projecting a LIBS laser beam of optical pulses along an optical path focused on an analysis spot over the conveying path, the analysis spot having dimensions of the order of one or a few mineral components of the ore samples, the LIBS module collecting a LIBS light signal returning along said optical path;

a height measuring device configured to measure in real time the sample height of a top surface of the ore sample stream at a point upstream the LIBS module and along a conveyor travel axis intersecting the LIBS laser beam;

a focus controller in communication with the height measuring device and configured to focus the LIBS laser beam at the sample height in synchronicity with the travel of the ore samples and with the optical pulses;

an air flow system configured to generate at least one air flow moving particles away from said optical path; and a processing unit for performing the mineralogy analysis of the ore sample based on the LIBS light signal.

In some implementations, the LIBS laser beam has a diameter at the analysis spot between about 70 μm and about 140 μm, and preferably about 100 μm.

In some implementations, the LIBS module comprises a focusing lens focusing the LIBS laser beam at the analysis spot, and a translatable lens mount configured to vertically displace the focusing lens under the control of the focus controller.

In some implementations, the system further comprises a conveyor speed measuring mechanism configured to provide a real-time measurement of a speed of travel of the ore samples on the conveyor and operatively connected to the focus controller.

In some embodiments, the conveyor speed measuring mechanism may comprise a rotary encoder in contact with a portion of the conveyor rotating at a rotating speed matching the speed of travel of the ore samples on the conveyor. In other embodiments, the conveyor speed measuring mechanism comprises first and second distance sensors positioned over the conveyor on a same plane parallel to a surface of the conveyor, the first and second distance sensors being separated by a predetermined spacing along the conveyor travel axis. The second distance sensor is vertically aligned collinearly with the LIBS laser beam. The focus controller may comprise a FPGA configured to sample a variable sample height signal from the height measuring device at a sampling frequency higher than a laser repetition rate of the LIBS laser beam. The FPGA may comprise an analog to digital converter.

In some implementations, the air flow system comprises a main nozzle mounted between the LIBS module and the conveying path. The main nozzle may have an upper end and a lower end allowing light propagation of the LIBS laser beam and of the plasma light therethrough, the main nozzle being shaped as a truncated cone tapering down from the upper end to the lower end. The air flow system may comprise a main air blower unit generating an escort air flow and connected to the main nozzle to inject the escort air flow therein proximate the upper end. The upper end of the main nozzle may be closed by a top wall preventing air circulation but allowing light therethough.

In some implementations, the air flow system comprises a secondary nozzle position adjacent the main nozzle and oriented at a small angle to the optical path, the secondary nozzle producing a cleaning air flow directed toward an area where the optical path intersects the conveying path.

The air flow system may comprise a secondary air blower unit generating the cleaning air flow and connected to the secondary nozzle.

In some implementations, the air flow system may comprise a scrapper nozzle disposed above the conveying path upstream of the LIBS module and configured and shaped to generate a scrapper air flow strong enough to remove unwanted material from a surface of the ore samples.

In some implementations, the system comprises one or more protection mechanisms preventing ore samples on the conveyor path from damaging components of the air flow system.

In some implementations, the mineralogy analysis performed by the processor comprises identifying and quantifying individual mineral signatures of constituents of the ore samples using chemometric data processing methods for deconvolution of mixed spectra.

Other features and advantages will be better understood upon a reading of prefered embodiments with reference to the appended drawings.

DETAILED DESCRIPTION

Figure 1:
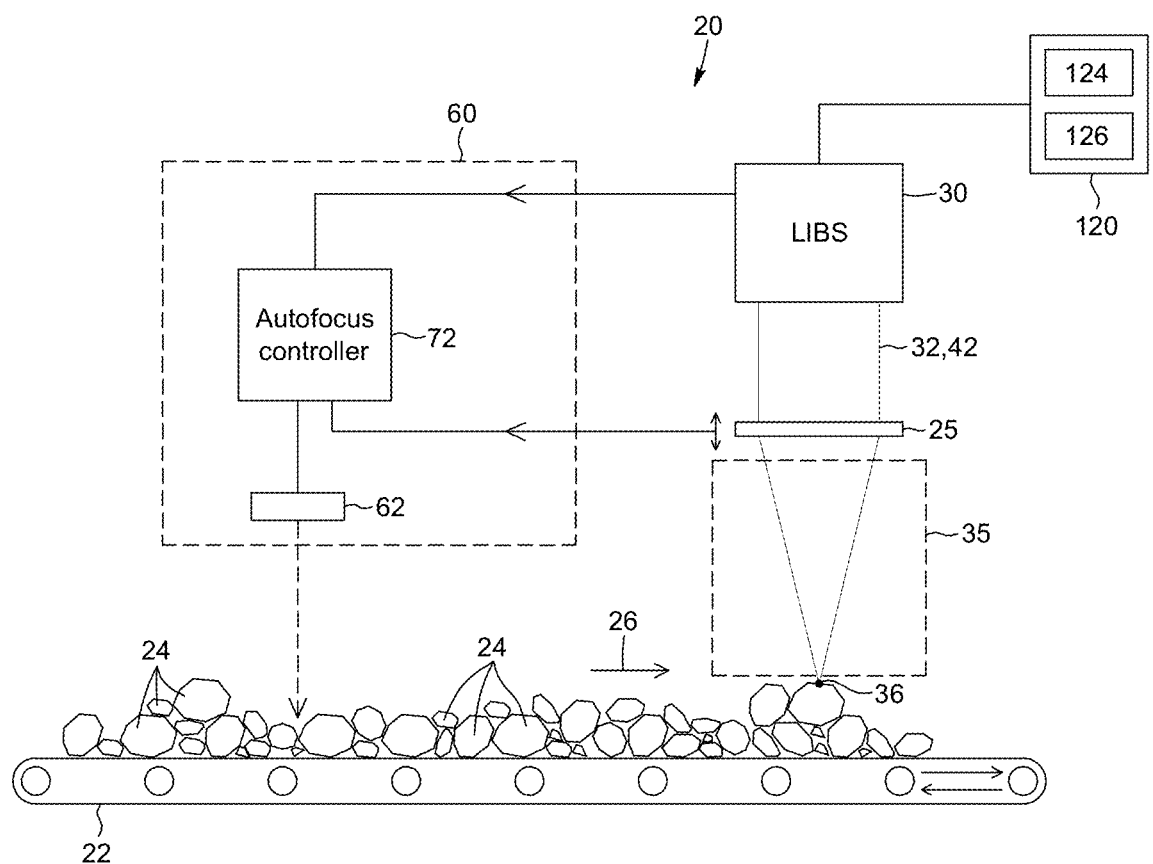
FIG. 1 is a schematized representation of a system according to one implementation.

The present description relates to systems for the online sorting of ore samples based on a mineralogy analysis of these ore samples.

In the following description, similar features in the drawings have been given similar reference numerals. In order not to unduly encumber the figures, some elements may not be indicated on some figures if they were already mentioned in preceding figures. It should also be understood herein that the elements of the drawings are not necessarily drawn to scale and that the emphasis is instead being placed upon clearly illustrating the elements and structures of the present embodiments.

The terms "a", "an" and "one" are defined herein to mean "at least one", that is, these terms do not exclude a plural number of items, unless stated otherwise. Terms such as "substantially", "generally" and "about", that modify a value, condition or characteristic of a feature of an exemplary embodiment, should be understood to mean that the value, condition or characteristic is defined within tolerances that are acceptable for the proper operation of this exemplary embodiment for its intended application. For example, the term "about" may mean within an acceptable error range for the particular value as determined by one of ordinary skill in the art, which will depend in part on how the value is measured or determined, i.e. the limitations of the measurement system. It is commonly accepted that a 10-20% precision measure is acceptable and encompasses the term "about".

In the present description, when a broad range of numerical values is provided, any possible narrower range within the boundary of the broader range is also contemplated. For example, if a broad range value from 0 to 1000 is provided, any narrower range between 0 and 1000 is also contemplated. If a broad range value from 0 to 1 is mentioned, any narrower range between 0 and 1, i.e. with decimal value, is also contemplated.

Unless stated otherwise, the terms "connected" and "coupled", and derivatives and variants thereof, refer herein to any structural or functional connection or coupling, either direct or indirect, between two or more elements. For example, the connection or coupling between the elements may be mechanical, optical, electrical, logical, or any combination thereof.

In the present description, the terms "light" and "optical", and variants and derivatives thereof, are used to refer to radiation in any appropriate region of the electromagnetic spectrum. The terms "light" and "optical" are therefore not limited to visible light, but can also include, without being limited to, the infrared or ultraviolet regions of the electromagnetic spectrum. Also, the skilled person will appreciate that the definition of the ultraviolet, visible and infrared ranges in terms of spectral ranges, as well as the dividing lines between them, may vary depending on the technical field or the definitions under consideration, and are not meant to limit the scope of applications of the present techniques.

In various implementations, the ore samples may be of mining origin in the general sense that they contain natural materials from the ground. Mining samples and ground-extracted samples typically include at least one valuable ore mineral species mixed with gangue consisting of unwanted or valueless rocks and minerals, as well as non-mineral species such as organic material, bitumen, etc. Systems and methods described herein may be useful in the context of the sorting of ore samples containing a mix of valuable mineral species and non-valuable mineral species, also referred to herein as mineral contaminants. Ore feedstocks with substantial loading of mineral contaminants are generally treated, though these treatments are costly, and/or have long lasting environmental costs. Sorting ore samples according to their mineral contents makes it possible to separate the valuable from non-valuable samples. A sorting threshold may be defined by the operator.

Ore sorting has a potential to upgrade a range of mineral ores a processing plant can efficiently process, leading to substantial reduction in downstream operating costs, limiting environmental harm by reducing mine wastes and improving ore quality and mineral recovery. Ore sorting techniques can remove gangue and below grade ore prior to the main processing steps. The overall energy, material and labour costs may be reduced, while considerably more valuable minerals are separated from the waste material.

System

FIG. 1 schematically illustrates a system 20 for online sorting of ore samples based on a mineralogy analysis according to one implementation.

The system 20 includes a conveyor 22 for moving a stream of the ore samples 24 along a conveying path 26. The conveyor 22 may for example be embodied by conveyors typically used to transport ore samples on mining sites.

LIBS Module

The system 20 further includes a LIBS module 30 for projecting a LIBS laser beam 32 of optical pulses along an optical path 35 focused on an analysis spot 36 scanned over variable height content of the conveying path 26, and collecting a LIBS light signal 42 returning along said optical path 35.

The acronym LIBS is well known in the art and stands for Laser-Induced Breakdown Spectroscopy (or Spectrometry). LIBS is a well-known technique to retrieve elemental information from a given sample. A typical LIBS measurement is performed as follows: a short laser pulse is sent and focused onto a sample surface; the surface is rapidly heated by the laser pulse, part of the material is vaporized, and the gas is transformed into plasma, the plasma composition being representative of the sample's elemental content; excited electrons in the plasma eventually return to the ground state of their associated atoms as the plasma cools, and the radiative electron recombination emits photons with discrete energies allowed by their associated atoms energy levels; and the emitted photons are collected and sent in a spectrometer to produce an optical spectrum. The spectral distribution of the collected plasma light (intensity versus frequency) is linked to the elemental composition of the plasma, hence the elemental composition of the sample can be determined. LIBS provides fast, localized, non-contact, and sensitive measurements of the elemental composition of the material. LIBS is relevant for identifying major elements and trace elements, the latter being typically measured with a sensitivity of few parts per million (ppm). Some of the advantages of LIBS are that it can be practiced in ambient conditions, and the technique can acquire spectra from a target located at fairly large distances, without any separate sample preparation (e.g. without any chemical or solvent-based sample preparation, or only with a laser ablating process using the same or another laser as the LIBS laser). Other benefits of LIBS include ability to detect low levels (ppm) of constituents, including lighter elements (e.g. Be, B, Li, Na, C, F). From a practical standpoint, implementation of LIBS can significantly reduce delays with sample preparation and data acquisition and, thus enable real-time (or near real-time) decision making.

Figure 2:
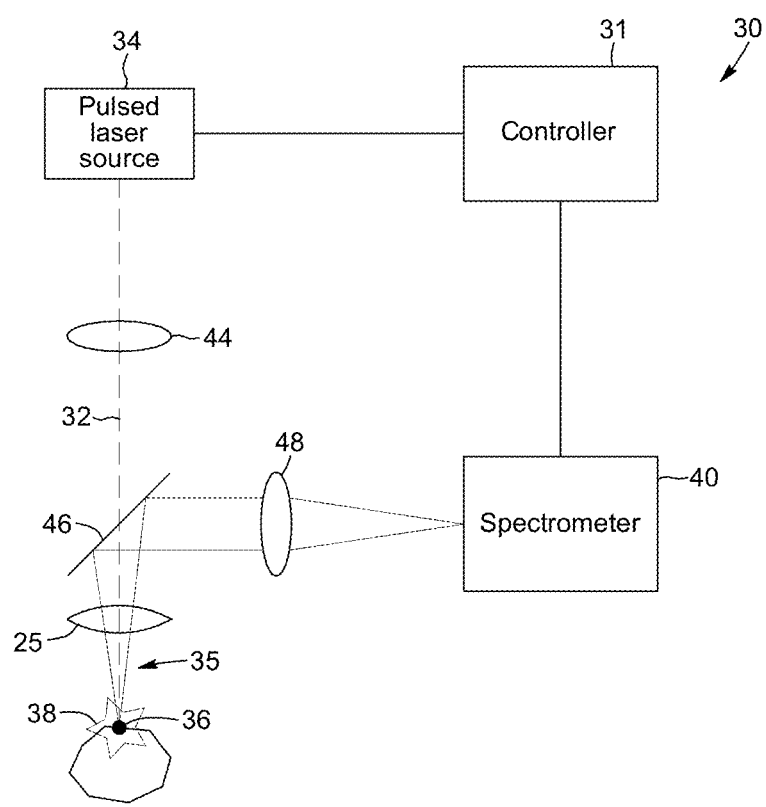
FIG. 2 is a schematized representation of a LIBS module according to one implementation.

FIG. 2 schematically illustrates configuration of a LIBS module 30 in accordance with one example. In the illustrated embodiment, the LIBS module 30 includes a pulsed laser source 34. The pulsed laser source 34 is configured for emitting a pulsed beam embodying the LIBS laser beam 32, which travels along an optical path 35 leading to the ore samples 24, as they cross the optical path 35 along their own travel along the conveying path 26. The LIBS laser beam 32 has a fluence suitable for vaporizing a volume of a sample 24 at an analysis spot 36, to produce a plasma 38 of the material. In some embodiments, the pulsed laser source 34 is operable at different settings (e.g. fluence, duty cycle, pulse duration, repetition rate) depending on its intended use, for example at a first set of settings to perform the LIBS measurements, and at a second set of settings to perform laser cleaning. By way of example, the pulsed laser source 34 may be embodied by a pulsed Nd:YAG laser source that generates laser pulses at a wavelength of 1064 nm. Pulse energy and duration may specifically be varied by the task to accomplish: cleaning material removal; or the LIBS measurement itself. The pulse's energy may vary from few microjoules to hundreds of millijoules. The pulse duration may vary from a few femtoseconds to hundreds of nanoseconds. The beam intensity typically reaches the GW/cm$^2$ regime at the analysis spot 36. The laser repetition rate depends on the laser source parameters and is typically of few Hz up to hundreds of kHz.

The LIBS module 30 may further include a spectrally resolved light detector 40 configured for detecting light from the plasma, referred to herein as "plasma light" or "LIBS light signal". The spectrally resolved light detector 40 may for example include optics, mirrors, and one or more spectrometers. Spectrometers are chosen following the required measurement needs. Key parameters of a spectrometer are, but not limited to, its optical throughput, its sensitivity, its spectral range, its spectral resolution, and its capability to timely gate the measurement.

The LIBS module 30 may further include a LIBS controller 31. The LIBS controller may be embodied by one or more control devices providing the required operational functions of the LIBS module 30 such as a laser control processor, circuit, or processor (software-defined) module for providing driving signals to the pulsed laser source 34, a spectrometer processor, circuit or module for operating the spectrometer including controlling any moving parts or imaging elements, and an output control processor, circuit, or processor module for receiving and digitizing data from the spectrometer device, extracting feedback therefrom, and outputting computed or measured values.

The system 20 described herein may further include any number of beam steering optical components collectively enabling the LIBS laser beam 32 to travel from the pulsed laser source 34 to the analysis spot 36, and the plasma light 42 to travel from the plasma 38 to the spectrally resolved detector 40. In the illustrated embodiment, by way of example only, the LIBS module 30 also includes a first lens 44 and a dichroic plate 46 successively in the path of the LIBS laser beam 32. The LIBS laser beam 32 is directed and focused on the analysis spot 36. The laser pulses vaporize and ionize a portion of the sample 24 at the analysis spot 36 to form the plasma 38. The plasma light 42 is reflected off the dichroic plate 46 and focussed on the spectrally resolved detector 40 through a second lens 48.

The LIBS laser beam 32 is focused at a location referred to herein as the analysis spot 36. As explained further below, the focus of the LIBS laser beam 32 is adjustable relative to the conveying path 26 so that the analysis spot 36 coincides with the top surface of an ore sample 24 directly below the LIBS module 30. In some implementations, a focusing lens 25 is provided as the output of the LIBS module 30, and may or may not be integrated with the LIBS module 30. The focusing lens 25 preferably has a vertically adjustable position so as to provide a focus adjustment and therefore move the analysis spot 36. The interaction of the LIBS laser beam 32 with the material of the ore sample 24 at the analysis spot 36 leads to the generation of the plasma 38, which is made by ionizing the elemental composition of the material of the ore sample 24 at the analysis spot 36. The LIBS module is configured such that the analysis spot 36 has dimensions of the order of one or a few mineral components of the ore sample 24. By way of example, in some implementations the beam diameter of the LIBS laser beam 32 at its focus, and therefore at the analysis spot, has dimensions in the range in the order of magnitude of 100 µm. In some implementations, the beam diameter of the LIBS laser beam 32 at its focus is between about 70 µm and about 140 µm. In this manner, the ionized species in the plasma in each measurement have relative concentrations which reflect specific mineral facet compositions and are more unique identifiers to the mineralogy of the material.

The plasma 38 emits plasma light 42 which has a spectral content corresponding to the collective emission spectra of the different ionized species in the plasma 38, weighted by prevalence, and subject to absorption and losses. The LIBS module collects this plasma light 42, also referred to as the LIBS light signal, as it propagates toward the LIBS module 30 along the reciprocal optical path 35 along which the LIBS laser beam 32 travelled. The LIBS light signal is eventually detected by the spectrally resolved light detector 40, providing a spectrally resolved detector signal, i.e. an electrical signal representing the intensity of the collected light as a function of wavelength. The position and relative intensities of the different emission lines of the spectrum associated with each element of the plasma are known from literature and/or calibration data. A processor 50 is provided in communication with the spectrally resolved light detector 40 for performing the mineralogy analysis of the ore sample based on the LIBS light signal, as explained in further detail below.

To ensure that the mineralogy content of the ore samples is assessed accurately, the LIBS light signal collected by the LIBS module needs to accurately represent the composition of the ore samples. It has been found by the inventors that the control of two particular factors may be required to enable sufficient accuracy for the sorting of ore material in real-time outside of the confines of a laboratories: on the one hand, the dimensions of the analysis spot, that is, the diameter of the LIBS laser beam where it intersects the top surface of an ore sample, should be small enough such that the ion species in the plasma are representative of only one or a few mineral components of the ore sample. On the other hand, the optical path should be substantially free of dust aerosols or other particles which could lead to a pollution of the collected LIBS light signals.

Focus Control

Referring again to FIG. 1, in accordance with one aspect, the system 20 includes components, for example collectively referred to herein as an "autofocus module" 60, configured to adjust the focus of the LIBS laser beam 32, in real-time, to move the analysis spot 36 perpendicularly to the conveyor 22 according to a height of the ore samples 24.

As mentioned above, to obtain good mineralogical LIBS data, a laser spot size in the 100 µm range is preferred. Obtaining a consistent spot size on a moving conveyor belt with varying rock size while staying synchronized with the laser repetition rate is a challenge. The correlation of the distance to ore surface to measurement has to be accurate during the laser pulse emissions, but need not be computed or accurate outside of the emission and detection intervals. In some implementations, this challenge is addressed moving the focusing lens 25, which is responsible for adjusting the focal point of the LIBS laser beam to provide a constant spot size at the sample surface, in time to account for the passage of the ore samples. The focus plane of the LIBS laser beam is thereby made to intersect the top surface of the ore sample crossing the optical path.

Figure 3A:
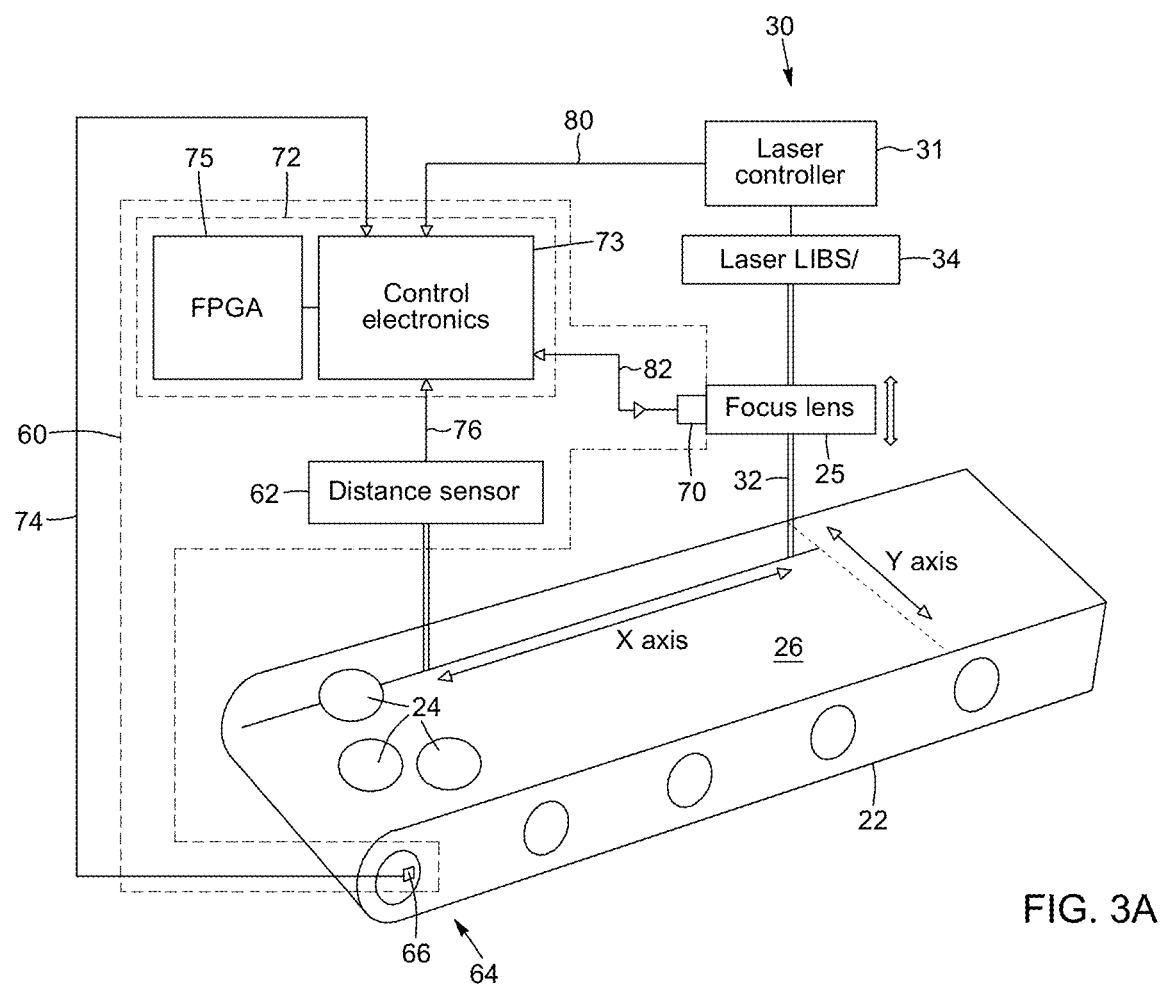
FIGS. 3A and 3B are schematized representations of variants of an autofocus according to different implementations.
Figure 3B:
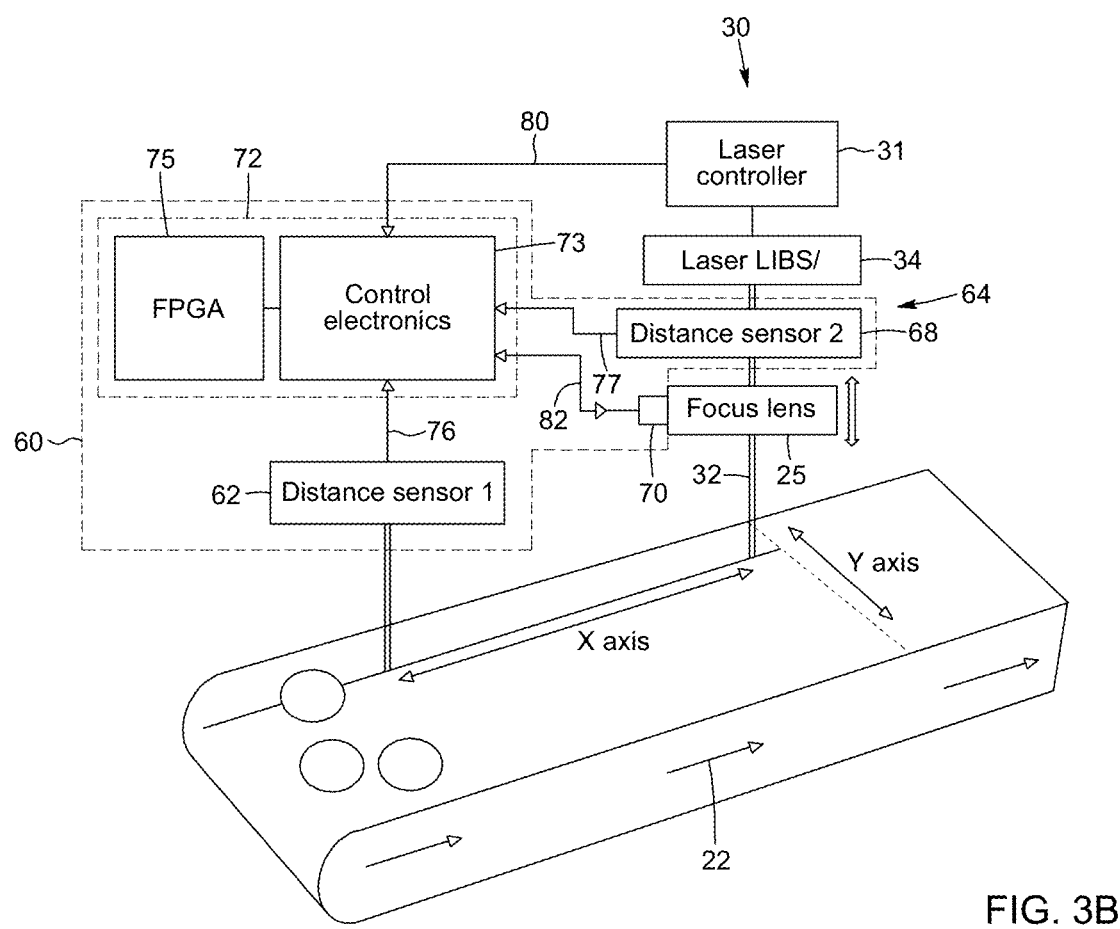

FIGS. 3A and 3B are schematic block diagrams of embodiments of an autofocus module 60. In some implementations, the autofocus module 60 generally includes a height measuring device, for example embodied by a distance sensor 62, configured to measure in real time a sample height of a top surface of the ore sample stream at a point upstream the LIBS module 30 and along a conveyor travel axis X intersecting the LIBS laser beam 32. The autofocus module 60 further includes a conveyor speed measuring mechanism 64 configured to provide a real-time measurement of a speed of travel of the ore samples on the conveyor 22, and a translatable lens mount 70 for vertically displacing the focusing lens 25. The autofocus module further includes an focus controller 72 in communication with the height measuring device, the conveyor speed measuring mechanism, the translatable lens mount and the LIBS module, and configured to focus the LIBS laser beam at the sample height in synchronicity with the travel of the ore samples and with the optical pulses. The focus controller 72 preferably works in real time to take as input: a conveyor speed signal 74 measured by the conveyor speed measuring mechanism 64; a variable sample height signal 76 measured by the distance sensor 62; and the laser repetition rate 80 from the LIBS module 30, and outputs focus control signals 82 to the lens mount 70 to operate a fast moving focus. The focus controller 72 may include an FPGA 75 to provide precision clocking signals controlling the timing of the focus control signals at the desired real-time precision.

In the illustrated embodiments, the distance sensor 62 is positioned above the conveyor 22, at a location upstream of the LIBS module 30. The distance sensor 62 is configured to measure the height, or vertical position, of the ore samples 24 as they are conveyed along the conveying path 26. The distance sensor may, for example, be embodied by a laser range finder having a spot size comparable to (i.e. of the same order of magnitude, preferably between 1/3 and 3 times, and more preferably between 2/3 and 3/2) that of the LIBS laser beam 32.

The conveyor speed measuring mechanism 64 may be any device, combination of devices or systems providing a real-time measurement of the speed of the conveyor 22.

Referring to FIG. 3A, in some implementations, the conveyor speed measuring mechanism 64 includes a rotary encoder 66 in contact with a portion of the conveyor 22, the encoder rotating at a rotating speed matching the speed of travel of the ore samples 24 on the conveyor 22, which may be for example the conveyor belt or a rotating table on which the conveyor belt is mounted. The rotary encoder 66 therefore rotates at the same speed as the travel of the ore samples 24. With a known number of encoder pulses per rotation and known encoder wheel diameter, and by measuring the frequency of the pulses, the speed of the conveyor 22 can be calculated. This method works well is reliable and responds well to fast speed changes, but one drawback is that it requires a contact with the moving surface.

Referring to FIG. 3B, alternatively, the conveyor speed measuring mechanism 64 may employ a contactless optical speed measurement method using cross correlation. This method may involve the use of first and second distance sensors positioned over the conveyor on a same plane parallel to a surface of the conveyor 22, the first and second distance sensors being separated by a predetermined spacing along the conveyor travel axis. In the illustrated embodiment, the distance sensor 62 positioned upstream of the LIBS module 30 defines a first distance sensor, and a second distance sensor 68 may be provided, preferably downstream of the first distance sensor 62, precisely aligned therewith along the conveyor travel axis (the X axis in the reference frame of FIG. 3B). In some variants the secondary distance sensor 68 is vertically aligned collinearly with the LIBS laser beam 32 to facilitate testing of the alignment. In other variants the secondary distance sensor 68 may be positioned at any other locations allowing a computation of the speed of the conveyor between the two sensors. Secondary sensor data from the secondary distance sensor 68 may be provided for processing to the control electronics 73 of the focus controller via a secondary sample height signal 77.

In some implementations, distance profile of the two distance sensors for N acquisition points is stored at a slower sampling rate, and a cross-correlation is performed to extract the time delay between the two profiles. Provided that the alignment between the two sensors is sufficiently precise, the cross correlation peak will correspond exactly to the time delay between the two distance profiles. Knowing the precise distance between the two distance sensors, the speed can be calculated using the relation $$S = \frac{d}{t},$$

where S is the speed of the conveyor, d is the distance between the two distance sensors and t is the time delay between the two distance profiles.

By way of example, good results were otained by the inventors in lab experiments embodying the speed measurement technique using two distance sensors with a distance of 5 cm therebetween, a sampling rate of 500 Hz-2 KHz with 512-2048 sampling points. A rolling average of at least 10 provided a stable value. A minimum speed may be required for this method to work well without requiring large amounts of memory. The cross correlation was implemented on the same FPGA responsible for the fast focusing system to minimize latencies in the focus calculation using this speed. Other experimental details include: the FPGA used was the De0-nano development board (Altera EP4CE22F17); the main FPGA clock was running at 50 MHz with good result but could also run a lot faster with internal PLL; the Laser repetition rate was 100 Hz; the XY2-100 protocol was used as the digital protocol to drive the focusing lens. It is a 20 bits protocol that runs between 2-4 MHz; the ADC was an 8 channel 12 bits, multiplexed running at 200 ksps maximum (ADC128S022); supporting electronics to do some signal conditioning on the distance sensors was embodied on a proto board prior to the ADC to scale down the voltage and transform 4-20 mA in usable voltage; differential drivers were used to drive the XY2-100 protocol; additional dc-dc converters as well as circuitry to feed the triggers, encoders and all supporting peripherals were added; two different models of distance sensors were tried:—one commercial OD-150 from SICK, and one homemade using a PSM-10 PSD sensor with a OT301SL trans impedance amplifier from ON-TRAK.

The focus controller 72 may be embodied by any device, circuits, systems or combinations thereof providing the desired functionalities. In the illustrated embodiment, The focus controller 72 includes control electronics 73 receiving the variable sample height signal 76, the conveyor speed signal 74 or secondary sample height signal and the laser repetition rate 80, and outputting the focus control signals 82 to the lens mount 70 in precise synchronicity with the laser pulses of the LIBS laser beam 32. In the illustrated embodiment, the FPGA 75 is responsible either for creating the trigger signals for the laser controller or to use them as an internal reference clock.

In one example of implementation, the autofocus module 60 is operated as follows: The distance (along the X axis) between the distance sensor 62 and the LIBS module 30 as well as the alignment on the Y axis are precisely adjusted and measured. The FPGA 75, for example provided with an analog to digital converter (ADC), samples the variable sample height signal 76 from the distance sensor 62 at a sampling frequency (10 KHz) higher than the laser repetition rate (100 Hz) of the LIBS laser beam. At every sampling of the Z axis measurement, the conveyor speed, as obtained through the conveyor speed signal 74 or an analysis of the variable sample height signal 76 and secondary sample height signal 77, and the X axis distance constant are used to calculate the remaining time before this ore sample 24 will reach the LIBS laser position. This remaining time is then compared with all the future laser Q-switch trigger, and once a timing match is found, a focus lens position is calculated. This lens position is calculated using the distance measurement from the distance sensor 62 and using a pre-calibrated curve of distance versus position of the focusing lens 44. This curve may be calibrated once during the initial setup, and can be updated at any time in the future via software to push new values to the FPGA 75.

The FPGA 75 then stores this focus lens position value in memory and sends it to the lens mount 70 at the right time to ensure that the laser spot is in focus. To ensure that the focus is stable during the laser pulse and since the position is known in advance due to the stored value, in some variants the moving command is sent at a predetermined lead delay prior to the laser pulse, for example 9 ms. This gives time for the focusing lens to stabilize after rapid movement before arrival of the laser pulse. After the laser fires, the focusing lens will have at least a 1 ms stable (no movement) window in which to collect the LIBS light before moving to a next position. These delay values can also be adjusted in software.

It is quite possible that multiple laser pulses happen before the ore sample moving under the distance sensor 62 reaches the laser position at different conveyor speeds. To account for that, a dynamic FIFO (First-IN, First-Out) table may be used to store the future lens position values in advance and fetch the correct position at the correct time. This FIFO may automatically resize itself to accommodate for changes in the conveyor speed for future samples.

Air Flow System

The mineralogical analysis of ore samples using LIBS measurements relies on an interpretation of the relative proportion of the contributions of elemental constituents of a given mineral to the signal received by the spectrally resolved light detector. The presence of dust or other particles in the optical path of the laser can create noise detrimental to the mineralogical analysis. Indeed, as the focused short laser pulses of the LIBS laser beam progress toward the rock surface, the light fluence increases and can become extremely high, for example hundreds of $J/cm^2$. Any aerial dust particle or aerosol crossing the optical path of the LIBS laser beam in this region may be absorbed and create unwanted plasma, which can add noise to the signal reaching the spectrally resolved light detector. Airborne dust can originate from the ambient air of the environment in which the system is operated, or can result from the saltation of ejected material generated by the LIBS ablation process, e.g. shockwave-generated particles. This later phenomenon increases with the repetition rate of the laser since the repeated shockwave created by the plasma projects more particles back towards the laser source.

Figure 4:
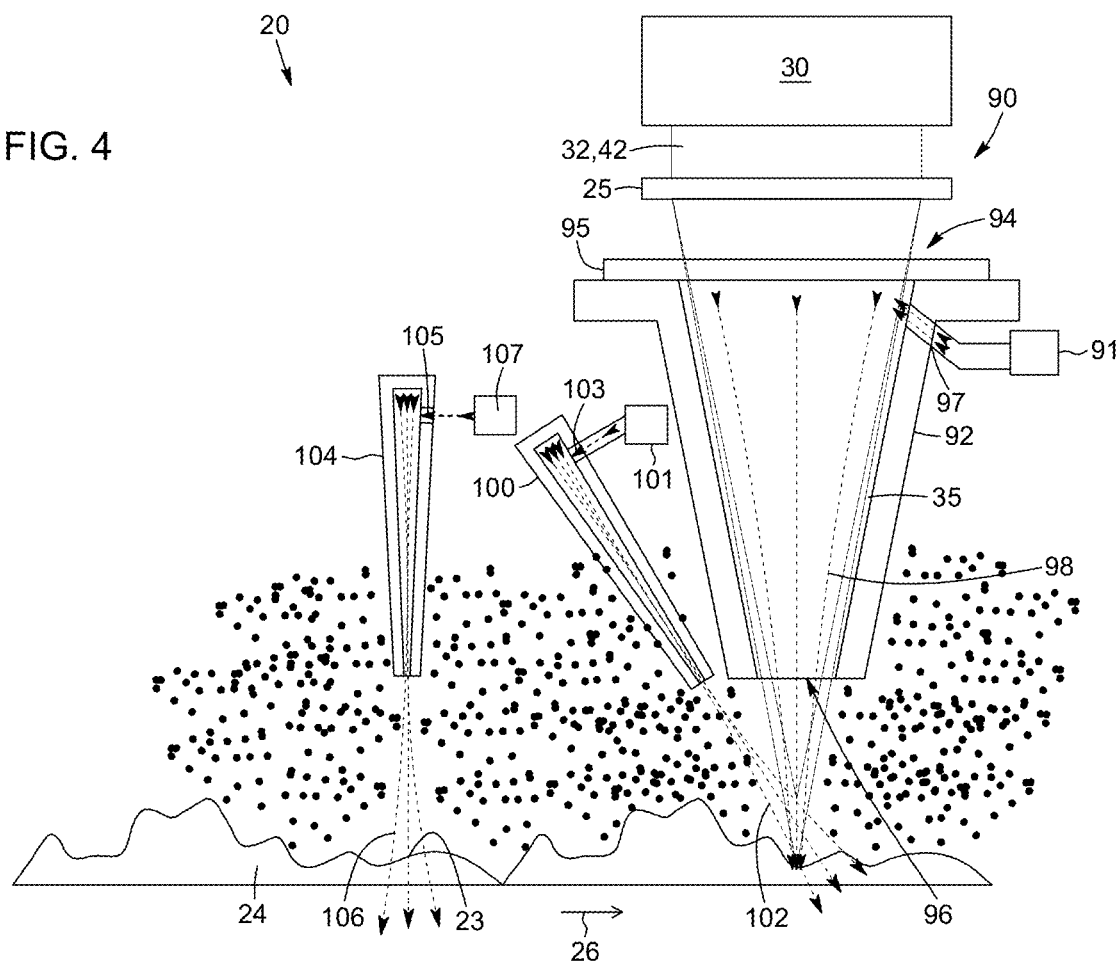
FIG. 4 is a schematized representation of an air flow system according to one implementation.

Referring to FIG. 4, in some implementations the system 20 includes an air flow system 90 configured to generate at least one air flow moving particles away from the optical path 35.

Referring to FIG. 4, in some implementations the air flow system 90 includes a main nozzle 92 mounted between the LIBS module 30 and the conveying path 26. The main nozzle 92 is preferably shaped as a truncated cone, tapering down from its upper end 94 to its lower end 96.

Both ends allow light propagation of both the LIBS laser beam 32 and the plasma light 42 therethrough. The main nozzle 92 guides an escort air flow 98 which maintains the optical path 35 free of airborne dust and other particles. The air flow system 90 may include a main air blower unit 91 generating the escort air flow 98 and connected to the main nozzle 92 to inject the escort air flow 98 therein proximate the upper end 94, for example through one or more hose or flexible conduit. In some implementations, the upper end 94 of the main nozzle 92 is closed by a top wall 95 preventing air circulation but allowing light therethough. By way of example, the top wall 95 may be embodied by an optical window made of a material transparent to light at least at the wavelengths of the LIBS laser beam and of the plasma light, such as a sheet or pellicle of glass, plastic or the like. An opening 97 is provided through a side wall of the main nozzle 92 proximate the upper end 94 to allow input of the escort air flow 98, which circulates downward in the main nozzle and exits at the open lower end 96. The escort air flow 98 therefore removes dust and other particles from the optical path 35, "escorting" these particles downwardly towards the conveying path.

In some implementations, the air flow system 90 further includes a secondary nozzle 100 position adjacent the main nozzle 92 and oriented at a small angle to the optical path 35. The secondary nozzle 100 produces a cleaning air flow 102 directed toward the general area where the optical path 35 of the LIBS system intersects the conveying path 26. The cleaning air flow 102 is preferably configured to "push away" the particles in the area of the analysis spot, including the particles outputted by the primary nozzle, the shockwave-generated particles as well as ambient air particles, leaving a substantially particle free optical path 35.

The air flow system 90 may include a secondary air blower or air compressor unit 101 generating the cleaning air flow 102 and connected to the secondary nozzle 100, for example through one or more hose or flexible conduit. An opening 103 is provided through a side wall of the secondary nozzle 100 to allow input of the cleaning air flow 102. As the shape of the secondary nozzle 100 is not limited by the optical path 35, the cleaning air flow 102 can include a plurality of air stream speeds and shapes, using less air volume that the main nozzle 92. Preferably, the escort air flow 98 from the main nozzle 92 and the cleaning air flow 102 from the secondary nozzle 100 generate air streams that allows for covering multiple values of sample height, without need for adjustment: the main nozzle 92 is collinear to the optical path 35, and the cleaning air flow 102 from the secondary nozzle 100 is shaped so as to cover the whole range of sample heights. It will be noted that as the plasma is generated during a very short time, of the order of a few nanoseconds, and the LIBS measurements are performed within few microseconds, the LIBS measurements takes place over a timescale much shorter than the timescale of blowing. Blowing therefore does not have the time to remove the plasma before generation of the plasma light.

In some implementations, the air flow system 90 may include a scrapper nozzle 104 disposed above the conveying path 26 upstream of the LIBS module 30. The scraper nozzle 104 is configured and shaped to generate a scrapper air flow 106 strong enough to remove unwanted material from a surface 23 of the ore samples 24. Advantageously, the scrapper air flow 104 can remove deposited material such as mud or dust at the top surface of the ore samples which could obstruct the path of the LIBS laser beam. The air flow system 90 may include a scraper air blower or air compressor unit 107 generating the scraper air flow 106 and connected to the scrapper nozzle 104 through a side wall opening 105.

Figure 5A:
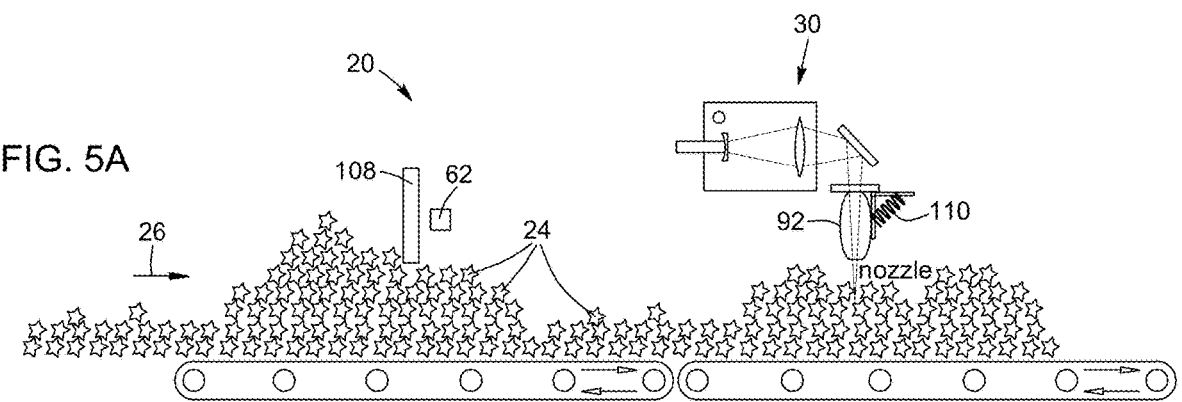
FIGS. 5A and 5B illustrate the use of protection mechanisms in a system as shown in FIG. 1 according to one implementation.
Figure 5B:
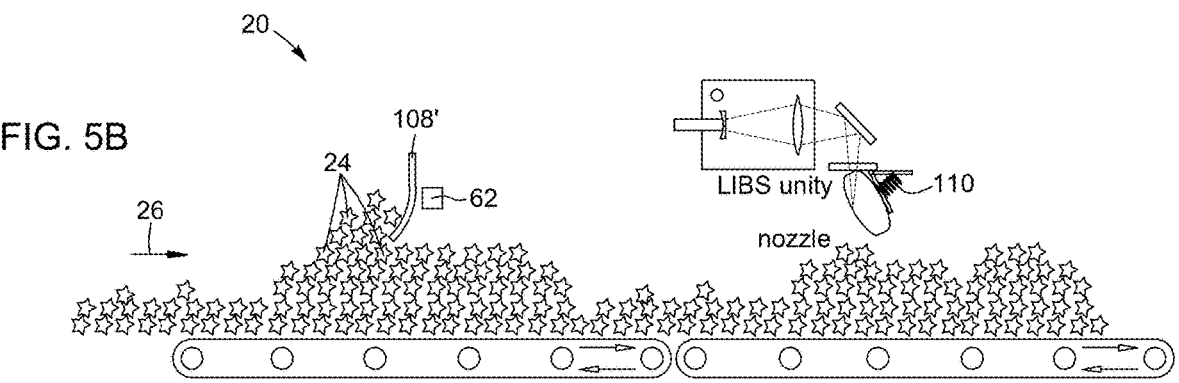

Referring to FIGS. 5A and 5B, in some embodiments the system 20 includes one or more protection mechanisms preventing ore samples on the conveyor path from damaging components of the air flow system. Rock streams on the conveyor path can have profiles that surpass the useful optical range. Since the air nozzles 92, 100 and 104 are the lowest part of the system, it is possible that such rock streams hit the nozzles and cause damage.

In one embodiment the protection mechanisms include a protection beam 108 or plough 108' disposed upstream of the first one of the nozzles (upstream of even the first distance sensor 62) along the conveying path 26. In some implementations, oversized rocks 24 is pushed back and/or rolled when hitting the protection beam 108, or diverted if a plough 108' is used. The protection beam 108 may be a sturdy beam of any shape, placed transversely to the conveying path 26 and therefore to the movement of the ore samples 24, or at an angle in the case of a plough 108. In typical embodiments the protection beam may be a box-beam or h-beam of steel, but any material that withstands the impact of the oversize rocks can be used. The same function can be realised by a plough of similar geometry or a blade geometry.

In another embodiment, the primary nozzle, the secondary nozzle and/or the scraper nozzle may be attached to a hinge system 110. In some variants, the LIBS module 30 may be at a low position so that a maximum number of samples can be probed, while the hinge system prevents an eventual nozzle-rock hit from damaging the system. In yet another variant, nozzles made from flexible material may be used.

Processing Unit

Referring again to FIG. 1, the system 20 further includes a processing unit 120 for performing the mineralogy analysis of the ore sample based on the LIBS light signal. The processing unit 120 may include a processor 124 and a memory 126.

The processor 124 may run an operating system and may execute computer programs, also known as commands, instructions, functions, processes, software codes, executables, applications, and the like. While the processor 124 is depicted in FIG. 1 as a single entity for illustrative purposes, the term "processor" should not be construed as being limited to a single processor, and accordingly, any known processor architecture may be used. In some implementations, the processor 124 may include a plurality of processing units. Such processing units may be physically located within the same device, or the processor 124 may represent the processing functionalities of a plurality of devices operating in coordination. For example, the processor 124 may include or be part of one or more of a computer; a microprocessor; a microcontroller; a coprocessor; a central processing unit (CPU); an image signal processor (ISP); a digital signal processor (DSP) running on a system on a chip (SoC); a single-board computer (SBC); a dedicated graphics processing unit (GPU); a special-purpose programmable logic device embodied in hardware device, such as, for example, a field-programmable gate array (FPGA) or an application-specific integrated circuit (ASIC); a digital processor; an analog processor; a digital circuit designed to process information; an analog circuit designed to process information; a state machine; and/or other mechanisms configured to electronically process information and to operate collectively as a processor.

The memory 126, which may also be referred to as a "computer readable storage medium" is capable of storing computer programs and other data to be retrieved by the processor 124. The stored data may include the LIBS light signal and the information extracted therefrom. The terms "computer readable storage medium" and "computer readable memory" refer herein to a non-transitory and tangible computer product that can store and communicate executable instructions for the implementation of various steps of the techniques disclosed herein. The computer readable memory may be any computer data storage device or assembly of such devices, including a random-access memory (RAM); a dynamic RAM; a read-only memory (ROM); a magnetic storage device, such as a hard disk drive, a solid state drive, a floppy disk, and a magnetic tape; an optical storage device, such as a compact disc (CD or CDROM), a digital video disc (DVD), and a Blu-Ray™ disc; a flash drive memory; and/or any other non-transitory memory technologies. A plurality of such storage devices may be provided, as can be appreciated by those skilled in the art. The computer readable memory may be associated with, coupled to, or included in a processor configured to execute instructions contained in a computer program stored in the computer readable memory and relating to various functions associated with the processor. Furthermore, the processor 124, the memory 126 of components thereof may be part of the LIBS module 30 or separate therefrom.

Since LIBS generates elemental spectra, the goal is to convert these spectra into mineralogical signatures. As mentioned above, one of the features and the system described herein is the control of the size of the analysis spot, such that it is commensurate with the size of one or a few mineral components. Larger spot sizes for LIBS measurements can lead to quite complex spectra arising from different minerals present in the ablated spot. In some implementations, Identifying and quantifying the individual mineral signature from a mixture can be performed using advanced chemometric data processing methods for deconvolution of mixed spectra known in the art. The description of the an example of a mineral analysis method used for proof of concept in the laboratory can be found in El Haddad, et al, "Multiphase mineral identification and quantification by laser-induced breakdown spectroscopy" Minerals Engineering, (2019), vol 134, pp. 281-290, the entire contents of which being incorporated herein by reference.

EXAMPLES

A set of rock tiles from a porphyry copper deposit in Australia was characterized by QMA and the resulting data were used to guide and validate the results obtained by LIBS. The LIBS mapping was obtained with a step size of 100 μm and a spot size of 70 μm. To compare the QMA and LIBS mapping, the spatial resolution of the QMA maps had to be reduced by averaging 400 points. Unsupervised multivariate curve resolution—alternating least square (MCR-ALS) method gives the best results for the identification, quantification and imaging of minerals on rock tiles, even in the presence of mixed mineral phases within the laser spot area (El Haddad et al., 2019).

Figure 6A:
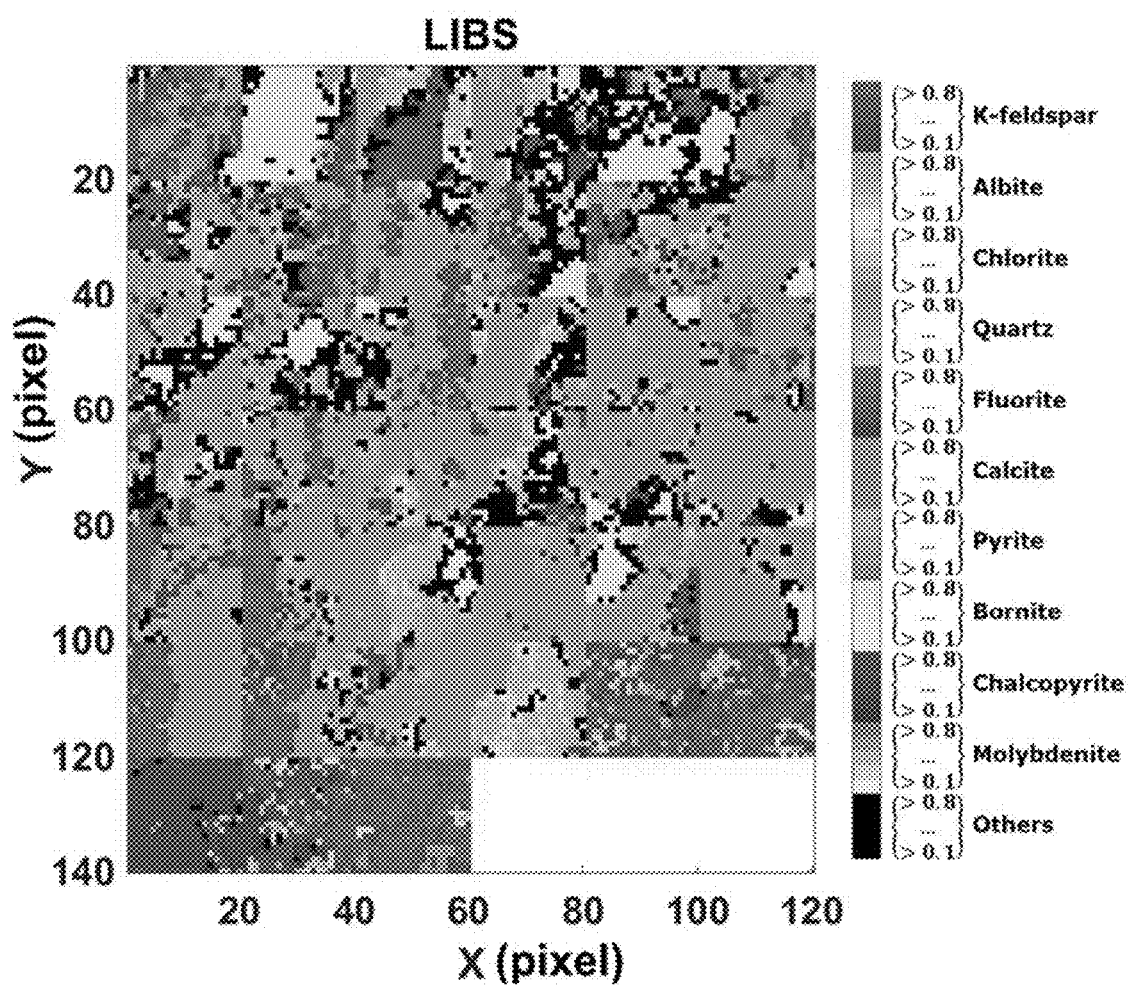
FIGS. 6A and 6B are images constrasting QMA and LIBS mapping.
Figure 6B:
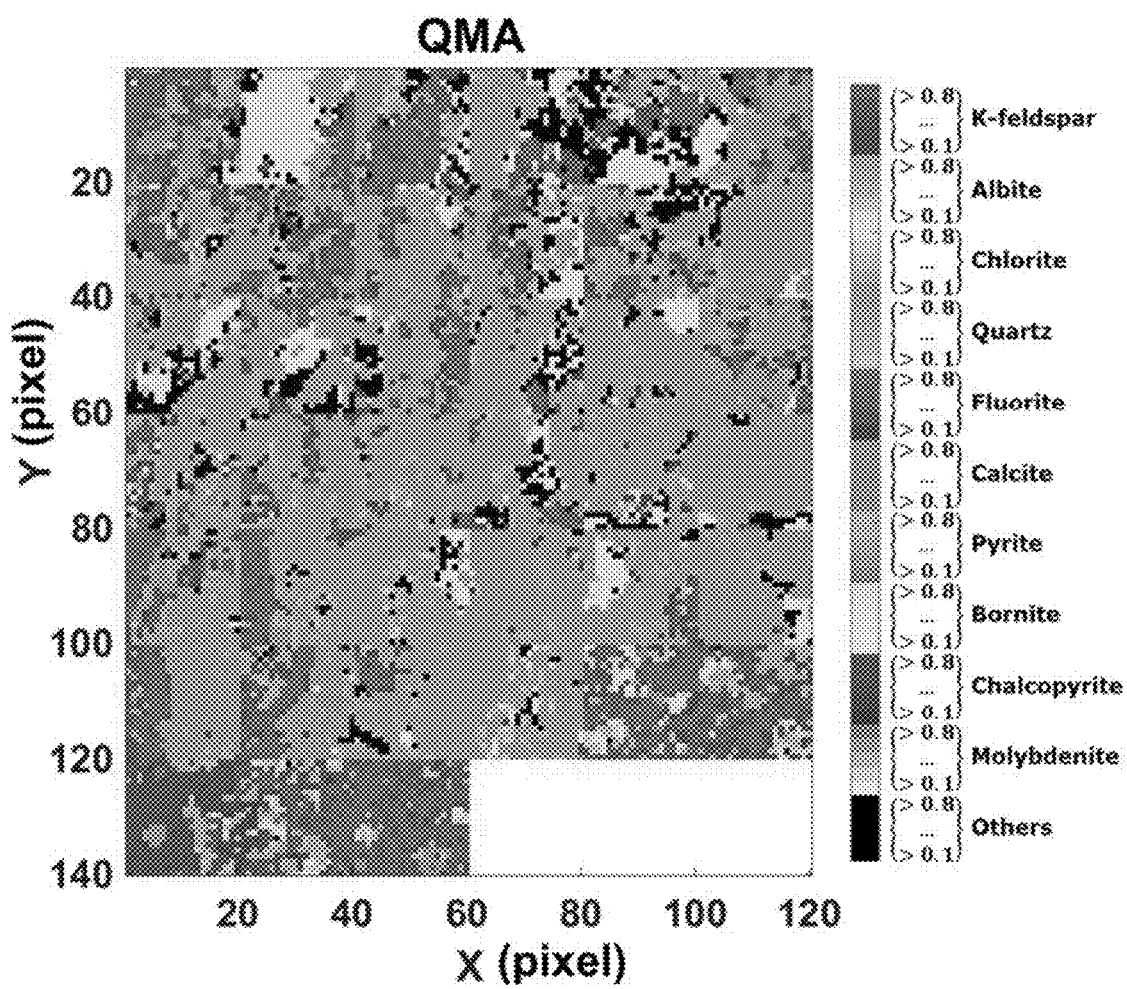

Mineral abundance and imaging were obtained with success for the mineral phases selected in the present work, which includes bornite, chalcopyrite, pyrite, molybdenite, quartz, chlorite, K-feldspar, albite, fluorite, and calcite. As mentioned earlier, one of the main challenges of the approach is to deconvolve mixed spectra. Limiting the size of the analysis spot to that of mineral constituents limits the number of distinct minerals in the analysis, for example 2 or 3 different minerals were present in the 70 µm probing spot on average, making the challenge more tractable. The method was first calibrated using LIBS and QMA data taken at the same locations. Validation of the model was obtained by processing a test set of LIBS data from different locations on the tiles and compared the results with the QMA data. The test set contained 39 maps of 20×20 pixels. FIGS. 6A and 6B are mineral abundance images comparing the LIBs results (FIG. 6A) to the QMA quantitative results (FIG. 6A. In both cases the pixel colour represents a mineral of the highest abundance at a given spatial location, and the colour gradient represents its abundance value. It should be noted that an abundance value of all minerals is measured by LIBS at each spatial location. The mineral distributions measured by LIBS are in good agreement with the corresponding QMA data used as reference. The predicted mineral abundance of each LIBS spot measurement is in good agreement with the reference QMA values, confirming the model's quantification ability.

Figure 7A:
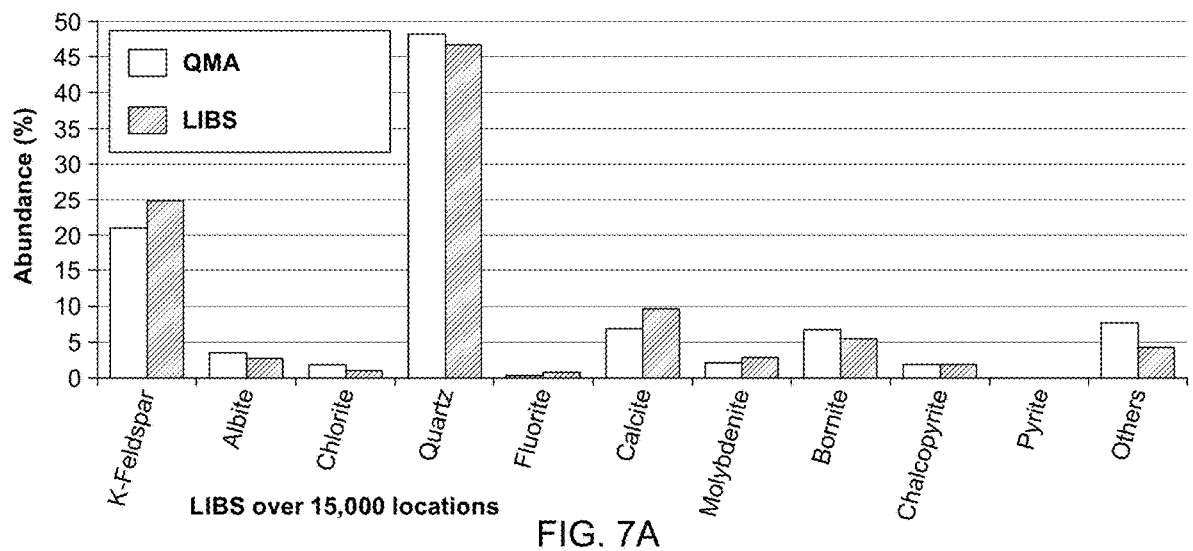
FIGS. 7A and 7B show the results of mineral phase abundance prediction and the associated absolute error for various minerals.
Figure 7B:
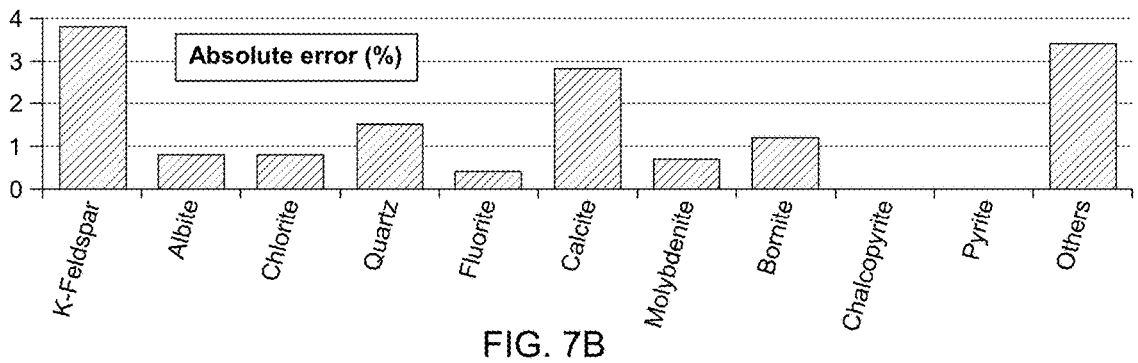

Similarly, in point-counting methods, the abundance of a given mineral phase is determined by the ratio of the number of measurement points where the mineral phase is detected, over the total number of measurement points. For LIBS measurements, mineral quantification is also performed within each measurement because a larger spot size usually covers more than one mineral phase, and the phase abundances are determined in a single measurement. Results of mineral phase abundance prediction over the whole maps are shown in FIG. 7. The value differences obtained by LIBS and QMA are assigned as an absolute error. This difference is lower than 4% for the 10 mineral phases analysed.

Following the encouraging results obtained on the porphyry copper tiles in a mapping mode and more importantly in a point-counting mode, the next step was to assess the robustness of both the LIBS technique and the chemometric data processing method in a more realistic environment.

Several studies were carried out to evaluate the sensitivity of the method to laser energy and spot sizes, examine the effect of non-polished rock surfaces, the presence of dust as well as the adapted LIBS sampling strategy. Some preliminary results and conclusions of these studies are presented below.

There is no obvious reason for the LIBS emission signal to be modified by the surface roughness of the rocks. However, to avoid any surprises later, the robustness of the prediction had to be tested on non-polished tiles or rocks. A series of tests using a system as presented herein was performed on single mineral rocks. Rocks of minerals present in the porphyry copper deposit, were purchased from Ward's ScienceR. The model was tested on polished and unpolished surfaces, and at different angles to mimic the facet angle distribution. A second approach was to measure sandblasted single mineral rock surfaces and compare the measurement predictions with polished tiles. A third method consisted of using the third LIBS laser shots at the same location to simulate a natural surface.

Quartz, microcline and calcite rocks were probed by LIBS to test the prediction of the method. Quartz was identified as 99% quartz but, surprisingly, microcline (K feldspar) was identified as 77% K-feldspar and 10% albite while calcite as 71% calcite and 26% quartz. The rocks were then characterized by X-Ray Diffraction (XRD), which confirmed the presence of the other minerals and the model predictions.

LIBS measurements at different angles were made on single mineral rocks to simulate the varying facet angles on real rock surfaces. The surfaces were also roughened using sandpaper for 50 seconds and 500 seconds to simulate real unpolished rock surfaces. For each condition, measurements were performed at 10 different positions on the sample with 3 replicates at each location. The spectra of the 3 replicates were then averaged and processed by the model. The results are quite consistent with those obtained at normal incidence. The results on Ward's quartz show very stable predictions from 98% to 100% quartz under the various conditions, as expected. The results on Ward's calcite present more fluctuations on both calcite and quartz predictions, which can be due to real variations of quartz to calcite from one location to the other. The results on Ward's microcline also present fluctuations, which can also be explained by real mineral concentration variations, but moreover, varying predictions of unknown or unrecognized minerals. These fluctuations are attributed to the model performance to correctly deconvolve signatures for minerals composed of the same elements in relatively similar proportion. For example, albite (NaAlSi3O8) and K-feldspar (KAlSi3O8) are separated only by the presence of Na and K. If any of these emission lines are saturated, the quantification can be degraded. In all cases tested, a clear correlation between the different conditions (angle, roughness, etc.) and the prediction fluctuations could not be found.

In a third experiment, three LIBS measurements were made at each location. The second and third laser shots were impinging on the ablated location from the first shot, which can mimic a real unpolished rock surface. The results show no clear difference or degradation of the predictions for the first, second and third laser shots. It should be noted that these measurements were performed on a porphyry copper tile and not a Ward single mineral sample. Also, the number of data points is quite significant, and the statistics are also more representative. The Root Mean Square Error (RMSE) values are similar for the first, second and third laser shot and the R2 is larger than 0.9 for all predicted minerals.

Of course, numerous modifications could be made to the embodiments described above without departing from the scope of protection.

The invention claimed is:

1. A system for the online sorting of ore samples based on a mineralogy analysis thereof, comprising:
    a conveyor for moving a stream of the ore samples along a conveying path, the ore samples having a variability of sample height over the conveyor;
    a LIBS module projecting a LIBS laser beam of optical pulses along an optical path focused on an analysis spot over the conveying path, the analysis spot having dimensions of the order of one or a few mineral components of the ore samples, the LIBS module collecting a LIBS light signal returning along said optical path;
    a height measuring device configured to measure in real time the sample height of a top surface of the ore sample stream at a point upstream the LIBS module and along a conveyor travel axis intersecting the LIBS laser beam;

a focus controller in communication with the height measuring device and configured to focus the LIBS laser beam at the sample height in synchronicity with the travel of the ore samples and with the optical pulses;

an air flow system configured to generate at least one air flow moving particles away from said optical path; and a processing unit for performing the mineralogy analysis of the ore sample based on the LIBS light signal.

2. The system according to claim 1, wherein the LIBS laser beam has a diameter at the analysis spot between about 70 µm and about 140 µm.

3. The system according to claim 1, wherein the LIBS laser beam has a diameter at the analysis spot of about 100 µm.

4. The system according to claim 1, wherein the LIBS module comprises a focusing lens focusing the LIBS laser beam at the analysis spot, and a translatable lens mount configured to vertically displace the focusing lens under the control of the focus controller.

5. The system according to claim 4, further comprising a conveyor speed measuring mechanism configured to provide a real-time measurement of a speed of travel of the ore samples on the conveyor and operatively connected to the focus controller.

6. The system according to claim 5, wherein the conveyor speed measuring mechanism comprises a rotary encoder in contact with a portion of the conveyor rotating at a rotating speed matching the speed of travel of the ore samples on the conveyor.

7. The system according to claim 5, wherein the conveyor speed measuring mechanism comprises first and second distance sensors positioned over the conveyor on a same plane parallel to a surface of the conveyor, the first and second distance sensors being separated by a predetermined spacing along the conveyor travel axis.

8. The system according to claim 7, wherein the second distance sensor is vertically aligned collinearly with the LIBS laser beam.

9. The system according to claim 7, wherein the focus controller comprises a FPGA configured to sample a variable sample height signal from the height measuring device at a sampling frequency higher than a laser repetition rate of the LIBS laser beam.

10. The system according to claim 8, wherein the FPGA comprises an analog to digital converter.

11. The system according to claim 1, wherein the air flow system comprises a main nozzle mounted between the LIBS module and the conveying path.

12. The system according to claim 11, wherein the main nozzle has an upper end and a lower end allowing light propagation of the LIBS laser beam and of the plasma light therethrough, the main nozzle being shaped as a truncated cone tapering down from the upper end to the lower end.

13. The system according to claim 12, wherein the air flow system comprises a main air blower unit generating an escort air flow and connected to the main nozzle to inject the escort air flow therein proximate the upper end.

14. The system according to claim 12, wherein the upper end of the main nozzle is closed by a top wall preventing air circulation but allowing light therethrough.

15. The system according to claim 11, wherein the air flow system comprises a secondary nozzle position adjacent the main nozzle and oriented at a small angle to the optical path, the secondary nozzle producing a cleaning air flow directed toward an area where the optical path intersects the conveying path.

16. The system according to claim 15, wherein the air flow system comprises a secondary air blower unit generating the cleaning air flow and connected to the secondary nozzle.

17. The system according to claim 1, wherein the air flow system comprises a scrapper nozzle disposed above the conveying path upstream of the LIBS module and configured and shaped to generate a scrapper air flow strong enough to remove unwanted material from a surface of the ore samples.

18. The system according to claim 1, comprising one or more protection mechanisms preventing ore samples on the conveyor path from damaging components of the air flow system.

19. The system according to claim 1, wherein the mineralogy analysis performed by the processing unit comprises identifying and quantifying individual mineral signatures of constituents of the ore samples using chemometric data processing methods for deconvolution of mixed spectra.

* * * * *